Figure 1:
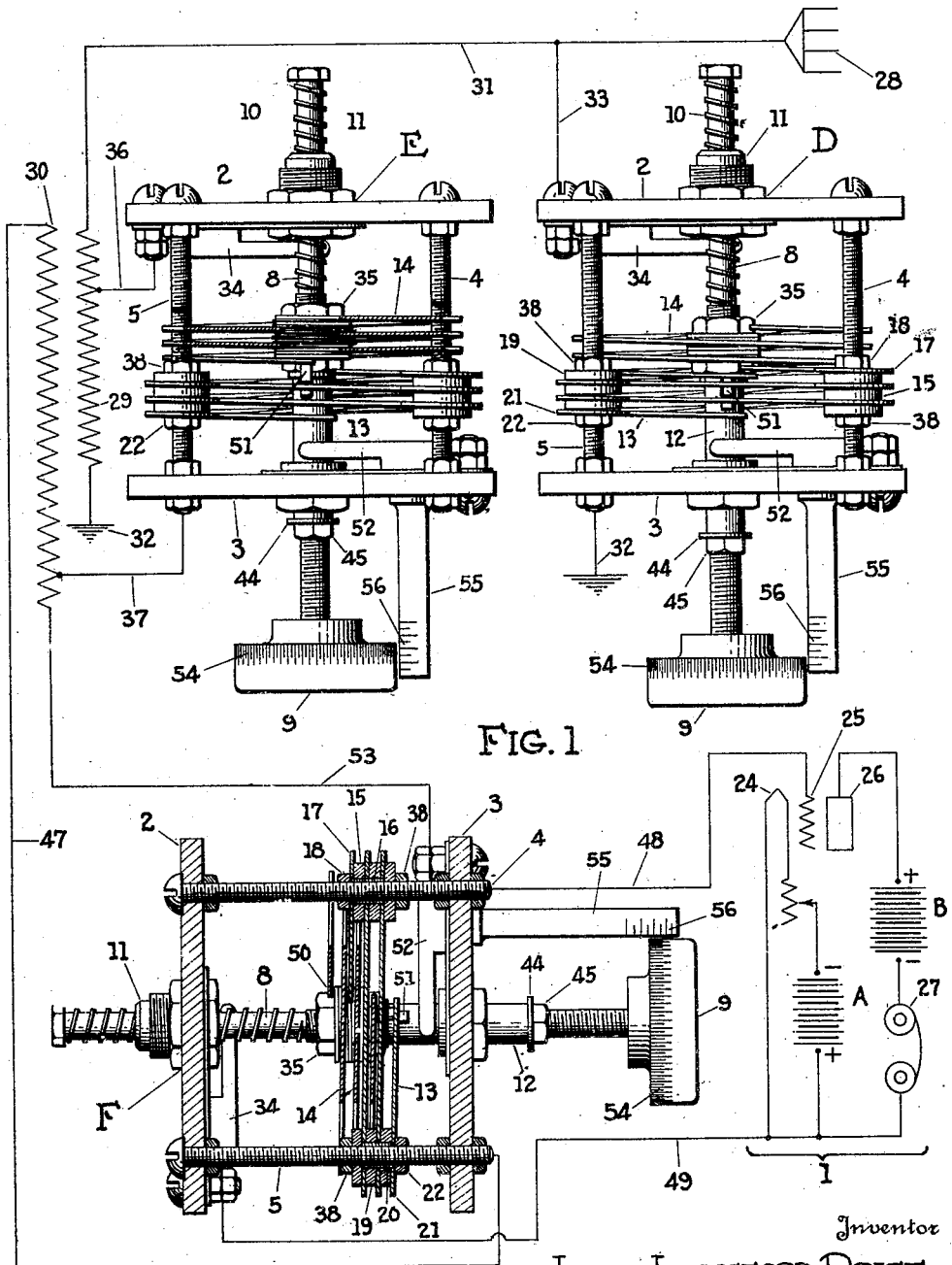

June 24, 1930.  J. L. PRICE  1,766,002
RADIO CAPACITANCE AND INDUCTANCE REGULATOR
Filed Feb. 28, 1927  2 Sheets-Sheet 1

Inventor
JOHN LANGFORD PRICE
By Owen H. Spencer
Attorney

June 24, 1930.   J. L. PRICE   1,766,002
RADIO CAPACITANCE AND INDUCTANCE REGULATOR
Filed Feb. 28, 1927    2 Sheets-Sheet 2.

Inventor
JOHN LANGFORD PRICE

By Owen H. Spencer
Attorney

Patented June 24, 1930

1,766,002

UNITED STATES PATENT OFFICE

JOHN LANGFORD PRICE, OF INDIANAPOLIS, INDIANA

RADIO CAPACITANCE AND INDUCTANCE REGULATOR

Application filed February 28, 1927. Serial No. 171,552.

The invention relates to radio regulating devices and more particularly to condensers and inductors used in radio receiving sets to minutely regulate the capacitance and inductance of the different electrical circuits, as desired.

It is an object of this invention to provide electrical instruments of this class in which the electrical capacitance may be manually varied to a minute and accurate degree, gradually thruout the entire range of adjustment from a minimum to maximum capacitance and inductance, or vice versa.

It is one of the main objects of the invention to provide an instrument of this class which when adjustably serving in its condensing functions, serves at the same time to vary inductance between the different conductors of the instrument.

It is an important object of the invention to provide an instrument of this class in which its inductive agents are automatically regulated with the corresponding adjusting of the condensing mechanism.

It is also an object to construct an instrument of this class in which the opposing condenser blades are intertwined in close proximity with each other in an auger or spiral manner, whereby the relative rotation of one blade will gradually increase the area of overlapping proximity, and thus very gradually vary the effect of the instrument thru a wide range of adjustment, without any actual contact of the blades with each other.

It is a further object to provide threaded means connected with each of said blades, the respective threaded means being so related that the adjusting of the blades with each other, in auger manner will at the same time operate the threaded means with each other and thereby control the amount of the overlapping of said blades, and keep them apart.

It is also an object to provide as a means of calibrating the different degrees of capacitance and inductance of the blades in respect to the relatively different positions, in the character of a graduated micrometer mechanism between same, whereby the different working results may be readily attained.

It is also an object to provide an instrument of this class of somewhat universal application, so that in constructing radio apparatus, one or more of said instruments may be used for one or more purposes, as desired, it being understood that one or more of said instruments may be used for the ordinary purposes of electrical condensation, and that at the same time in the same apparatus one or more of said instruments may be used to serve as combined regulators of both capacitance and inductance.

Figure 2:
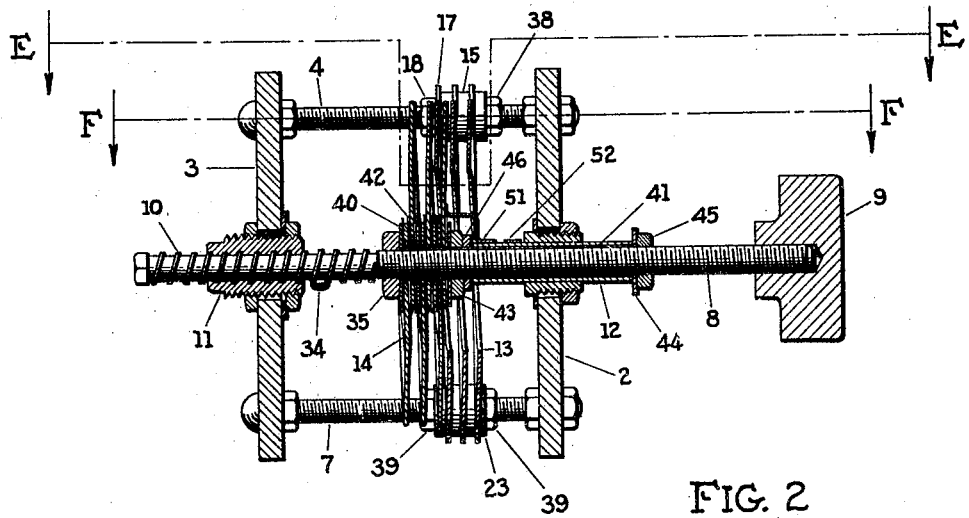
Figure 3:
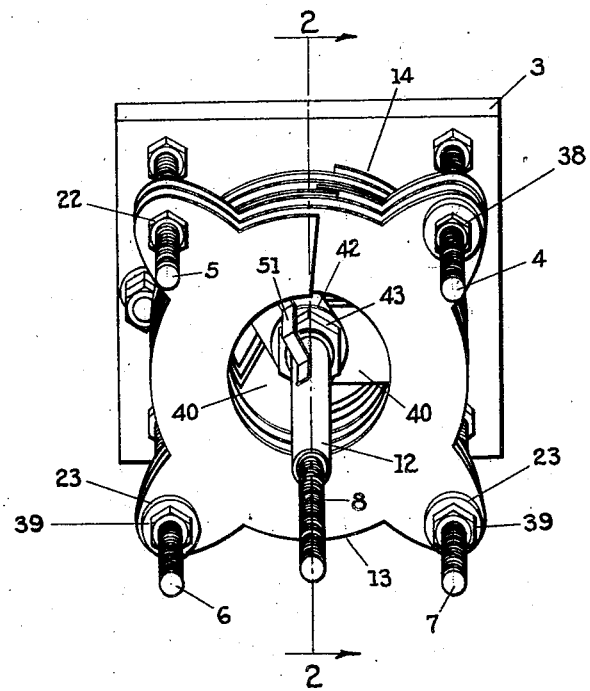

The above and other objects are attained by the structure illustrated in the accompanying drawing, in which Fig. 1 is a diagrammatic representation of a typical radio receiving set, which embodies the instruments D, E and F; Fig. 2 is a sectional view of one of the instruments of the apparatus taken in the proximity of line 2—2 of Fig. 3; and Fig. 3 is a perspective view of one of the instruments with certain parts thereof removed. Instrument E is shown as a sectional part of Fig. 1, taken in the proximity of line E—E Fig. 2; and instrument F is shown as a sectional part of Fig. 1, taken in the proximity of line F—F of Fig. 2.

Similar characters of reference designate similar parts thruout the different parts of the drawing.

Referring to Fig. 1, the letters, D, E and F, designate three different instruments which are used in the radio set shown, for different purposes in operating the radio receiver 1.

Each instrument comprises end members 2 and 3, preferably of rubber or similar non-conductive material, said members being secured in spaced relation, by means of bolts or the like 4, 5, 6 and 7, all of which are shown in Fig. 3.

Extending transversely thru the members 2 and 3 is a shaft 8, having at its outer end, a conventional dial structure 9, while the opposite extremity thereof is provided with a spiral thread 10, which passes through an interiorly threaded socket 11, fixed to the member 3. The end of the shaft 8 having the dial 9 thereon, slides with a sleeve 12, guided by member 2, so that when the shaft is rotated, it may move lengthwise thru the socket 11.

Fixed to the bolts 4, 5, 6, 7 and between the end members 2 and 3, is a stationary blade 13, which is coiled in a continuous spiral or auger formation, while secured to the shaft 8 is a similarly constructed movable blade 14, said blades being so arranged that they will nest with each other without contact when the shaft is rotated in one direction and withdrawn therefrom when the shaft is rotated in the opposite direction.

All the coils of said stationary blade are insulated from the bolt 4, by the washers 15 and bushing 16 except the end 17, which is connected with said bolt thru the nut 18, while all the coils are insulated from the bolt 5 by the insulating washers 19 and bushing 20, except the end 21, said end being connected to the bolt 5 by a nut 22, but otherwise insulated from said bolts. Said stationary blade 13 is insulated from the bolts 6 and 7, by the insulating washers 23 and the bushings similar to bushings 16 and 20, the insulation and arrangement of these parts being best shown in the instrument F of Fig. 1.

Associated with the instrument F is any preferred form of receiver 1, comprising batteries A and B, filament 24, grid 25, plate 26 and ear phones 27, the instruments of the apparatus also having associated therewith the conventional form of antenna 28. Arranged collaterally with the instrument D is the primary induction coil 29 of conventional form, while associated with the instrument E is said primary coil and said secondary coil 30.

The primary circuit of the apparatus is comprised of the antenna 28, the conductor 31, the primary induction coil 29, and the ground connection means 32, all arranged in order as stated. The instrument D is collaterally hooked with said primary coil, by the conductor 33 which joins the conductor 31 and thus is communicated with said antenna, the brush 34, the shaft 8, the nut 35, the blade 14, the blade 13, the nut 22, the bolt 5 and the ground connection means 32. The instrument D therefore serves as a control condenser for the primary coil 29, as understood by those familiar with the art.

Interposed between the primary coil 29 and the secondary coil 30, the instrument E also serves to vary the inductive relation between said primary and secondary coils, the primary coil being communicated with the blade 14 by means of the conductor 36, the brush 34, the shaft 8 and the nut 35; and the secondary coil being communicated with the blade 13 by means of the conductor 37, the bolt 5 and the nut 22.

The nuts 38 serve to confine the different turns of the fixed blade 13 and the insulating washers 15 and 19 toward the nuts 18 and 22 on the bolts 4 and 5 respectively; and similar nuts 39 and insulating washers 23 and insulating bushings similar to bushings 16 and 20 retain and entirely insulate the different turns of said fixed blade from bolts 6 and 7 and from each other. Said blade is insulated from all of said bolts by the insulating bushings 16 and 20 which suitably enclose said bolts in cooperation with the washers 15, 19 and 23 and insulate said blade from all of said bolts except as above described.

The movable blade 14 is conveniently secured to the shaft 8 by different spokes 40, formed on different turns of said blade. Said spokes are spaced along on said shaft over the insulating bushing 41, the insulating washers 42 being strung on said shaft between said spokes; and the nut 43 of said shaft serves to confine same toward the nut 35. The insulating bushing 41 is disposed snugly over the shaft 8 thru said spokes and thru the insulating washers 42, and the sleeve 12; and the insulating washer 44 is disposed on said shaft between the outer ends of the sleeve 12 and bushing 41 and the nut 45 which is threaded on said shaft to keep said sleeve and bushing and the washer 44 in place.

An insulating washer 46 is provided between the nut 43 and the sleeve 12.

The secondary circuit of the apparatus comprises the secondary coil 30, conductor 47, and bolt 5, the end 21 of the blade 13, the coils of said blade 13, the end 17 thereof, the bolt 4, the receiver conductor 48, the receiver 1, the conductor 49, the brush 34, the shaft 8, the nut 35, the end 50 of the blade 14, the coils of the blade 14, the tongue 51, the brush 52 and conductor 53 to the secondary coil 30, communicating in order as stated.

Referring to the condenser D, a certain portion of the current force from the antenna 28 reaches the blade 13 thru its conductor 32 and bolt 5. While a certain amount of current force accumulates in the corresponding blade 14, by means of the conductor 33 and brush 34 and shaft 8. Said blades condense and retain amounts of the current force which intermittently boosts or re-energizes the current passing to the primary coil 29.

Referring to the instrument E, the current tends to pass from the primary coil 29 to the secondary coil 30, by means of the conductor 36, the brush 34, the shaft 8, the blade 14, the blade 13, the bolt 5 and the conductor 37. The instrument E, therefore, condenses the current between said secondary and said primary coils and tends to bridge between said coils to vary their inductive force, as desired.

It will thus be seen that the condensers D and E merely have approaching circuits and are used exclusively for condensing purposes in the usual manner, while the condenser F both condenses and induces current, a portion of the current being induced across the gap between the blades 13 and 14 and thus creating parallel inductive circuits thru said condenser F, the effect of which is correspondingly varied with the condensing effect by manipulation of the blade 14.

All the condensers operate in the same manner, that is, by turning the dial structure 9 to the left, the blade 14 will be moved away from the blade 13, thereby lessening the condensation of the blades, while by turning the dial to the right, the blade 14 will be gradually turned into the spirals of the blade 13, or nested therewith, thus increasing the adjacent area.

The dials 9 are provided on their peripheries with substantially micrometer graduations 54, with which cooperate bars 55, extending parallel with the shaft 8 and in close proximity to the peripheries of the dials. The bars 55 are also provided with graduations 56 so that a very minute adjustment of the shafts 8 may be obtained and the exact degree to which the blades 14 are intertwined with the blades 13, instantly determined.

Any suitable number of the instruments D, E and F may be operated in unison by providing conventional mechanical driving connections (not shown) between the different shafts 8, it being understood that the instruments thus combined are properly synchronized in relation to each other, that is to say each instrument would be constructed to balance the circuits which it controls correspondingly with the circuits varied by the other instruments.

While the description and drawing illustrates in a general way, certain instrumentalities which may be employed in carrying the invention into effect, it is evident that many modifications may be made in the various details, without departing from the scope of the appended claims, it being understood that the invention is not restricted to the particular forms, herein described.

What I claim is:

1. In a radio receiver circuit, a tuning device whose elements constitute a combined variable inductance and variable capacity, the tuning device consisting of a rotor having spiral convolutions and a coacting stator having spiral convolutions, several mounting means for the stator forming conductors in the circuit, a supporting shaft for the rotor forming a conductor in the circuit, said stator being in conducting relation with a different one of said mounting means adjacent to each of its extremities and being otherwise insulated from said mounting means, said rotor at one extremity being in conducting relation with said shaft, conductor means in the circuit for making contact with the other extremity of the rotor, said rotor between its extremities being insulated from the said shaft, the insulation in the aforesaid instances aiding in producing an inductor effect.

2. In a radio receiver circuit, a tuning device whose elements constitute a combined variable inductance and variable capacity, the tuning device consisting of a rotor having spiral convolutions and a coacting stator having spiral convolutions, several mounting means for the stator forming conductors in the circuit, a supporting shaft for the rotor forming a conductor in the circuit, said stator being in conducting relation with a different one of said mounting means adjacent to each of the extremities of its convolutions and being otherwise insulated from said mounting means, the convolutions of said rotor at one extremity being in conducting relation with said shaft, conductor means in the circuit for making contact with the other extremity of the convolutions of the rotor, said rotor convolutions between said extremities being insulated from the said shaft, means providing for screw movement of said shaft and rotor so that the latter may nest with respect to the stator, the insulation in the aforesaid instances aiding in producing an inductor effect.

3. In a radio receiver circuit, a tuning device whose elements constitute a combined variable inductance and variable capacity, the tuning device consisting of a spiral rotor and a coacting spiral stator, end members, several mounting means for the stator forming conductors in the circuit, said mounting means connecting said end members, a supporting shaft for the rotor forming a conductor in the circuit, a screw connection between said shaft and one of said end members to mount the shaft for screw action to nest the convolutions of the rotor and stator, said stator being in conducting relation with a different one of said mounting means adjacent to each of its extremities and being otherwise insulated from said mounting means, said rotor at one extremity being in conducting relation with said shaft, conductor means in said circuit and supported by one of the end members to make contact with the other extremity of the rotor, said rotor between its extremities being insulated from the said shaft, the insulation in the aforesaid instances aiding in producing an inductor effect.

In testimony whereof, I have hereunto set my hand on this the 19th day of February, 1927, A. D.

JOHN LANGFORD PRICE.